(12) United States Patent
Peltonen

(10) Patent No.: US 8,721,145 B2
(45) Date of Patent: May 13, 2014

(54) LIGHT DEVICE FOR A MOTOR VEHICLE

(75) Inventor: Tomas Peltonen, Södertälje (SE)

(73) Assignee: Scania CV AB (SE)

( * ) Notice: Subject to any disclaimer, the term of this patent is extended or adjusted under 35 U.S.C. 154(b) by 22 days.

(21) Appl. No.: 13/380,149

(22) PCT Filed: Jun. 14, 2010

(86) PCT No.: PCT/SE2010/050662
§ 371 (c)(1),
(2), (4) Date: Dec. 22, 2011

(87) PCT Pub. No.: WO2010/151209
PCT Pub. Date: Dec. 29, 2010

(65) Prior Publication Data
US 2012/0106180 A1    May 3, 2012

(30) Foreign Application Priority Data
Jun. 23, 2009   (SE) .................................. 0900849

(51) Int. Cl.
B60Q 1/26   (2006.01)
(52) U.S. Cl.
USPC ........................... 362/540; 362/485; 362/545
(58) Field of Classification Search
USPC .......... 362/231, 485, 487, 495, 510, 540, 545
See application file for complete search history.

(56) References Cited

U.S. PATENT DOCUMENTS

| 5,209,559 | A | 5/1993 | Ruppel | |
|---|---|---|---|---|
| 5,299,102 | A | 3/1994 | Zimmerman, III | |
| 5,430,625 | A | 7/1995 | Abarr et al. | |
| 6,095,663 | A | 8/2000 | Pond et al. | |
| 6,273,588 | B1 * | 8/2001 | Arakelian | 362/510 |
| 6,286,984 | B1 * | 9/2001 | Berg | 362/231 |
| 2004/0130904 | A1 * | 7/2004 | Yamada et al. | 362/487 |
| 2008/0068849 | A1 * | 3/2008 | Ostroski et al. | 362/540 |
| 2008/0080199 | A1 * | 4/2008 | Sassoon | 362/487 |
| 2009/0251078 | A1 * | 10/2009 | Oh et al. | 362/183 |

FOREIGN PATENT DOCUMENTS

CN   201021193 Y   2/2008
DE   20312419 U1   11/2003

OTHER PUBLICATIONS

International Search Report dated Sep. 6, 2010, issued in corresponding international application No. PCT/SE2010/050662.
Chinese Office Action mailed Jul. 3, 2013 in corresponding Chinese Patent Application No. 201080027450.X, along with an English language translation of relevant portions thereof.

* cited by examiner

*Primary Examiner* — Y My Quach Lee
(74) *Attorney, Agent, or Firm* — Ostrolenk Faber LLP

(57) ABSTRACT

The present invention relates to a light device for a motor vehicle. The light device is arranged to be mounted on the motor vehicle, and comprises at least a first light emitting part arranged to emit a colored side marking light and at least a second light emitting part arranged to emit a substantially white light so as to illuminate an area around the light device for improved visibility in the area. The invention also relates to a motor vehicle provided with such a light device.

15 Claims, 3 Drawing Sheets

LIGHT DEVICE FOR A MOTOR VEHICLE

CROSS-REFERENCE TO RELATED APPLICATIONS

The present application is a 35 U.S.C. §§371 national phase conversion of PCT/SE2010/050662, filed Jun. 14, 2010, which claims priority of Swedish Application No. 0900849-1, filed Jun. 23, 2009, the contents of which are incorporated by reference herein. The PCT International Application was published in the English language.

TECHNICAL FIELD

The present invention relates to a light device for a motor vehicle, and having features displayed. The present invention also relates to a motor vehicle comprising such a light device.

BACKGROUND OF THE INVENTION

When operating a motor vehicle, e.g. when reversing and/or during precision driving, it is often a problem to know the position of different parts of the motor vehicle and proximity of the motor vehicle parts to obstructing objects. This is especially true when operating the motor vehicle in dark or under near dark conditions. For large motor vehicles, such as trucks, tractors and towing vehicles, with or without one or more trailers connected, this problem is even worse since the size and design of these types of motor vehicles further limits the visibility even more.

Motor vehicles are often equipped with reversing lights which more or less illuminates an area behind the motor vehicle, but the visibility around the sides of the motor vehicle are not illuminated by the reversing lights decreasing visibility.

U.S. Pat. No. 6,095,663 discloses a light assembly for a motor vehicle. The light assembly comprises a planar substrate containing a plurality of light sources for emitting light, wherein the light sources are placed in the same plane.

SUMMARY OF THE INVENTION

An object of the present invention is to provide an alternative solution for illuminating an area around a side of a motor vehicle for improving visibility in that area when operating the motor vehicle, e.g. when reversing and/or precision driving. It is another object of the invention to provide a cost effective solution to the problem of illuminating an area around the side of a motor vehicle for improved visibility.

According to one aspect of the present invention, the above mentioned objects are achieved by a light device for a motor vehicle. The light device is mounted on the motor vehicle comprises at least a first light emitting part configured and arranged to emit a colored side marking light and at least a second light emitting part configured and arranged to emit a substantially white light so as to illuminate an area around the light device for improved visibility in the area.

Different embodiments of a light device according to the invention are disclosed in the dependent claims.

According to another aspect of the invention, the above mentioned objects are achieved by a motor vehicle comprising at least one light device described above.

With a light device according to the invention, improved visibility in an area around the light device is provided, preferably around the sides of the motor vehicle. Therefore, driving operations like reversing and/or precision driving may be facilitated due to the improved visibility.

Furthermore, since a side marking function and a visibility light function are combined into one single unit, space for mounting lights on a motor vehicle can be saved. Also, manufacturing cost and infrastructure, such as power and control wiring, can be reduced due to the fact that the light device incorporates the two mentioned functions.

Other advantages and applications of the present invention will be apparent from the following detailed description of the invention.

BRIEF DESCRIPTION OF THE DRAWINGS

The appended drawings are intended to clarify and explain the present invention, in which.

DETAILED DESCRIPTION OF EMBODIMENTS OF THE INVENTION

According to the present invention two different light functions are incorporated into a single light device. A first light function relates to indicating the side position of a motor vehicle and a second light function relates to improving the visibility around the light device. The first function is often provided by a side marker light device, the placement and design aspects of which are regulated by international conventions and national law concerning road safety. Therefore, these concerns should be regarded when designing the first light function in a light device according to the invention.

Figure 1:
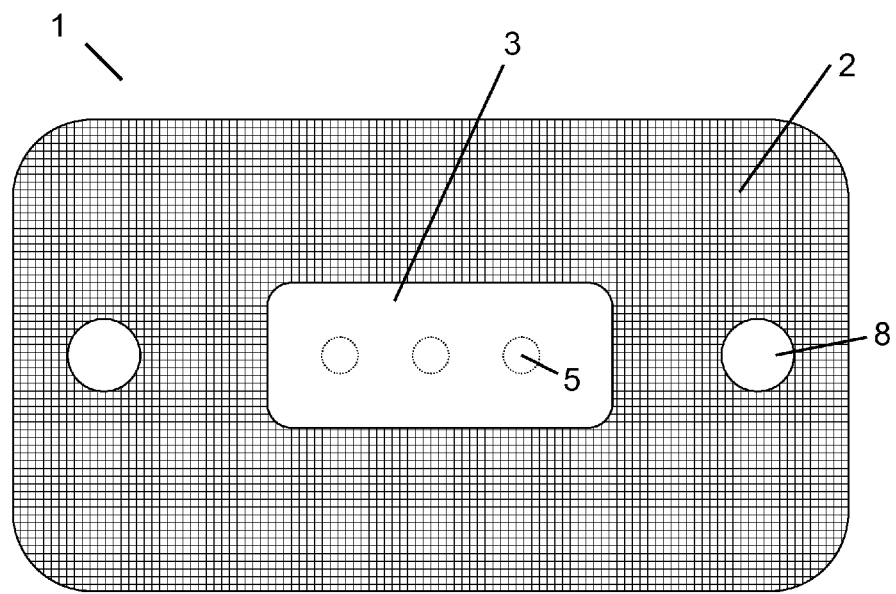
FIG. 1 schematically shows an embodiment of a light device according to the present invention shown with a light lens.

FIG. 1 shows an embodiment of a light device 1 according to the present invention. The light device 1 is in FIG. 1 shown with a light lens, and shown without the light lens in FIG. 2. The light device 1 comprises a first light emitting part 2 arranged to emit a colored side marking light according to road safety provisions, and a second light emitting part 3 arranged to emit a substantially white light for improved visibility and around the light device 1.

In this embodiment, the light device 1 also comprises two through holes 8 at the left and right side of the device 1 for mounting the light device 1 on a side of a motor vehicle, e.g. by means of screws or any other suitable fastening means. The motor vehicle may include one or more trailers on which the light device 1 also can be mounted. Other fastening arrangements for mounting the light device 1 on a motor vehicle and/or trailers are possible.

Figure 2:
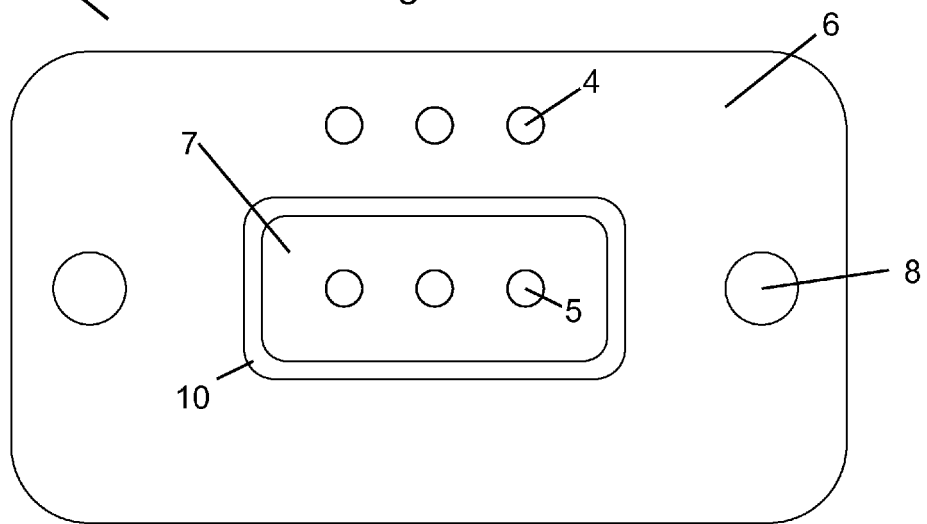
FIG. 2 schematically shows the embodiment in FIG. 1 shown without the light lens.

The first light emitting part 2 comprises at least one first light source 4, e.g. a light emitting diode, light bulb or a gas discharge lamp, electrically connectable to a power source, e.g. by means of an electrical wiring to an electrical system of the motor vehicle (not shown in the figures), and is arranged to be mounted on a first reflective housing 6 shown in FIG. 2. Colored side marking light may be provided by the first light source 4 emitting a prescribed side marking color and a non-colored neutral transparent lens enclosing the first reflective housing (not shown in the figures), or by the first light source 4 emitting white light and the side marker lens being colored and hence colors the white light emitted by the first light source 4. An embodiment in which the first light emitting part 2 comprises a colored (represented by crossed lines in FIG. 1) transparent lens is shown in FIG. 1.

The light device 1 also includes a second light emitting part 3 comprising at least a second light source 5 electrically connectable to a power source (not shown) and arranged to be mounted on a second reflective housing 7 enclosed by a non-colored transparent lens. Hence, a substantially white light is emitted from the second light emitting part 3 which illuminates an area around the light device 1 and therefore improves the visibility in that area. The number of second light sources 5, the optical design of the second reflective housing 7 and the light lens, the voltage rating of the individual light sources 5, etc will determine the visibility and the size of the area in which the improved visibility is achieved. Hence, these are design parameters which should depend on the sought effect of the light device 1, which is well understood by the skilled person.

As aforementioned, FIG. 2 shows the embodiment in FIG. 1 without the light lens. The first 6 and second 7 reflecting housings are in this embodiment formed in a single piece, and therefore the first 2 and second 3 light emitting parts are in this embodiment separated by a non-transparent element 10 with the result that the light emitted from the first 2 and second 3 light emitting parts will not be mixed inside the light device 1. The non-transparent separating element 10 may e.g. be made of moulded plastic or sheet metal.

In the same manner, the side marker transparent colored lens and the non-colored transparent lens can also be formed in one single piece (as shown in FIG. 1) and enclose a single reflective housing or a two part reflective housing. A single, or two part transparent lens can be made of glass or plastic, and preferably also be arranged to have reflective properties, which is common for these types of lenses.

It should further be noted from FIG. 1 that the first 2 and second 3 light emitting parts each comprises three light emitting sources 4,5; further that the first light emitting part 2 surrounds the second light emitting part 3 and is separated from the same by means of the above mentioned non-transparent separating element 10.

Figure 3:
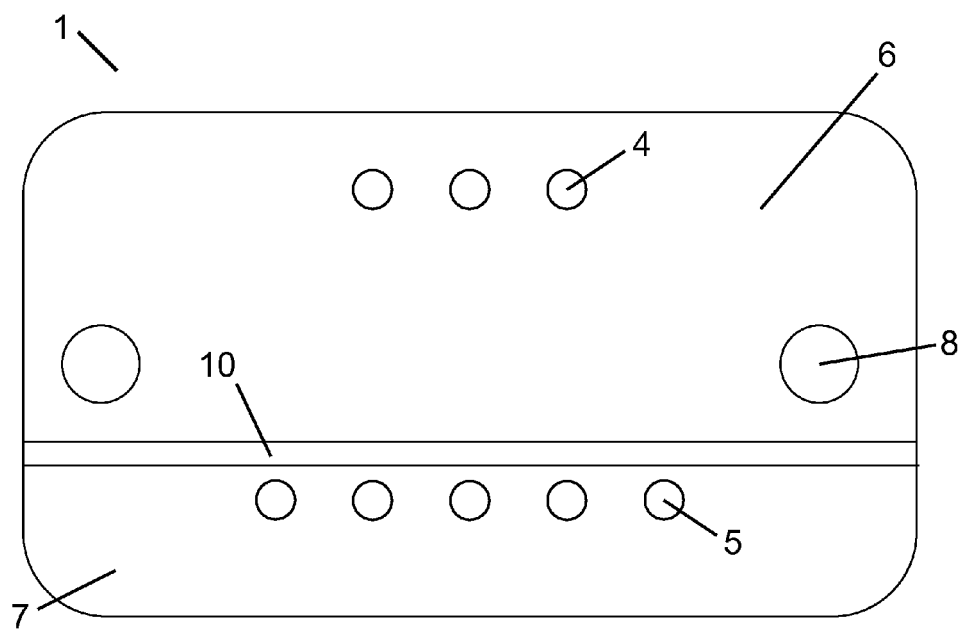
FIG. 3 shows another embodiment of the invention shown without a light lens.

FIG. 3 schematically shows another embodiment of a light device, shown without a light lens. In this embodiment the first light emitting part 2 forms the upper part of the light device 1 and the second light emitting part 3 forms the lower part of the light device 1, and the first 2 and second 3 light emitting parts are separated by a straight non-transparent separating element 10. The first light emitting part 2 comprises three light sources 4 while the second light emitting part 3 comprises five light sources 5 in this particular embodiment. Other configurations regarding the number of first 4 and second 5 light sources are of course possible.

Figure 4:
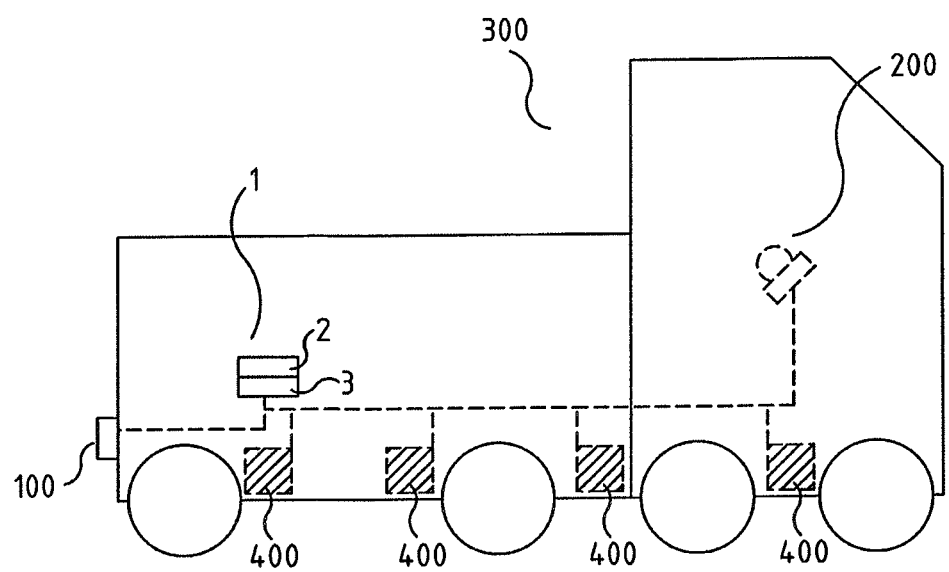
FIG. 4 shows yet another embodiment of the present invention in which the second light emitting part is activated by means of a manually operated switch or a brake system of a motor vehicle.

As shown in FIG. 4, The second light emitting part 3 may in another embodiment of the invention be activated when the brake lights 100 of a motor vehicle 300 and/or trailer having brakes 400 are activated, which means that the light device 1 could be controlled by a control system controlling the brake lights 100. The second light emitting part 3 may in another embodiment be activated by means of a manually operated switch 200, preferably mounted in a cabin of a motor vehicle 300 so that a driver easily can control the second light emitting part 3. The second light emitting part 3 may be controlled by the manually operable switch 200 via an electrical control system of the motor vehicle.

It is also possible to control the second emitting light part 3 so that a different number of light sources 5 is activated depending on the sought illuminating effect. For example, if the second light emitting part 3 comprises six light emitting diodes as light sources 5, the light device 1 could be arranged so that one, two, four or six light emitting diodes are activated at the same time and in this manner controlling the light/illuminating effect provided by the second light emitting part 3. This effect could e.g. be controlled with the manually operated switch having a plurality of operating positions.

Furthermore, according to another embodiment of the invention, the light emitted by the second light emitting part 3 is directed substantially towards the ground, which can be achieved by means of a reflector or lens arrangement incorporated in the light device 1. Therefore, it is preferable if the light device 1 is mounted at some height on the motor vehicle or trailer so that the light can be directed in a direction from the light device 1 downwardly to the ground.

Finally, it should be understood that the present invention is not limited to the embodiments described above, but also relates to and incorporates all embodiments within the scope of the appended independent claims.

The invention claimed is:

1. A light device configured for mounting of said light device, said light device comprising
    at least a first light emitting part configured to emit a colored side marking light,
    at least a second light emitting part configured to emit a substantially white light and located and configured to illuminate an area around said light device wherein said first light emitting part surrounds said second light emitting part on at least four sides of said second light emitting part and said first light emitting part comprises at least one first light source, said at least one first light source not surrounding said second light emitting part.

2. A light device according to claim 1, wherein said at least one first light source is electrically connectable to a power source and said first light emitting part comprises a first reflective housing on which said at least one first light source is mounted, said at least one first light source being enclosed by a transparent lens, said at least one first light source and said transparent lens being together configured so as to emit a colored, side marking light.

3. A light device according to claim 2, wherein said at least one first light source emits white light and said transparent lens is colored.

4. A light device according to claim 2, wherein said at least one first light source emits colored light and said transparent lens is non-colored.

5. A light device according to claim 2, wherein said second light emitting part comprises at least one second light source electrically connectable to a power source and a second reflective housing on which said at least one second light source is mounted, said at least one second light source being enclosed by a non-colored transparent lens so as to emit a substantially white light.

6. A light device according to claim 5, wherein said device is operable so that white light can be varied in terms of light effect, and white light is emitted substantially towards the ground from said light device.

7. A light device according to claim 5, wherein said first and/or second light sources are a light emitting diode, a light bulb or a gas discharge lamp.

8. A light device according to claim 5, wherein said first and second reflective housing are formed in one piece.

9. A light device according to claim 8, wherein said colored transparent lens and said non-colored transparent lens are formed in one piece and enclose said first and second reflective housings formed in one piece.

10. A light device according to claim 5, wherein said first and second light emitting parts are separated by a non-transparent separating element configured and located to prevent mixing of light emitted from said first and second light sources inside said light device.

11. A light device according to claim 1, wherein
said light device is connectable to a motor vehicle or a trailer having brakes and a brake light operable to indicate operation of the brakes; and
said second light emitting part is configured and connected to be activated when brake lights of said motor vehicle or said trailer are activated.

12. A light device according to claim 1, wherein said light device is connectable to a motor vehicle or a truck, said second light emitting part being activated by a manually operated switch.

13. A light device according to claim 12, wherein said light device is connectable to a motor vehicle or a truck having brakes and a brake light operable to indicate operation of the brakes, and a cabin for a driver and said manually operated switch is mounted in said cabin of said motor vehicle.

14. A motor vehicle comprising at least a light device according to claim 1.

15. A motor vehicle comprising at least a light device according to claim 5.

\* \* \* \* \*

UNITED STATES PATENT AND TRADEMARK OFFICE
CERTIFICATE OF CORRECTION

PATENT NO. : 8,721,145 B2  Page 1 of 1
APPLICATION NO. : 13/380149
DATED : May 13, 2014
INVENTOR(S) : Tomas Peltonen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 9 days.

Signed and Sealed this

Twenty-ninth Day of September, 2015

Michelle K. Lee
*Director of the United States Patent and Trademark Office*